US010051715B2

(12) United States Patent
Hick et al.

(10) Patent No.: US 10,051,715 B2
(45) Date of Patent: Aug. 14, 2018

(54) POWER OVER ETHERNET-BASED TRACK LIGHTING SYSTEM

(71) Applicant: Leviton Manufacturing Co., Inc., Melville, NY (US)

(72) Inventors: Robert L. Hick, Newberg, OR (US); Kenneth Eidsvold, Santa Ana, CA (US); Thomas W. Leonard, Tualatin, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 15/806,707

(22) Filed: Nov. 8, 2017

(65) Prior Publication Data

US 2018/0139823 A1  May 17, 2018

Related U.S. Application Data

(60) Provisional application No. 62/422,176, filed on Nov. 15, 2016.

(51) Int. Cl.
*H05B 37/00* (2006.01)
*H05B 37/02* (2006.01)
(Continued)

(52) U.S. Cl.
CPC ......... *H05B 37/0263* (2013.01); *F21V 21/35* (2013.01); *H04L 12/10* (2013.01);
(Continued)

(58) Field of Classification Search
CPC ............ H05B 37/0254; H05B 37/0218; H05B 37/0263; H05B 37/0272; H05B 33/0857;
(Continued)

(56) References Cited

U.S. PATENT DOCUMENTS 7,587,289 B1   9/2009   Sivertsen
7,885,250 B2   2/2011   Whittaker
(Continued)

FOREIGN PATENT DOCUMENTS

CN   203349214 U   12/2013
CN   105530103 A   4/2016
(Continued)

OTHER PUBLICATIONS

Boyce et al., "Low Voltage LED Lighting Control System"; Project Plan, May 13, 2013.
(Continued)

*Primary Examiner* — Monica C King

(57) ABSTRACT

The present disclosure relates to a system that utilizes Power over Ethernet (PoE) to supply low voltage direct current (DC) power to a PoE enabled track lighting system. The system facilitates communications with individual track heads located in a PoE enabled low voltage track channel so that the operational characteristics of the individual track heads can be controlled (e.g., dim, brighten, change color), so that feedback on functional status of individual track heads can be obtained, and so that total system current can be regulated. The PoE track lighting system includes a PoE track interface (PTI) device that receives current and communication signals. The PTI device receives the digital communication signals, converts them to a second digital commination signal in a format more suitable for transmission along the communication conductors in the track channel, and transmits the second digital communication signal to the communication conductors of the track channel.

24 Claims, 13 Drawing Sheets

(51) Int. Cl.
    *F21V 21/35*     (2006.01)
    *H04L 12/10*     (2006.01)
    *H04W 4/00*     (2018.01)
    *F21Y 115/10*     (2016.01)
    *H04W 4/70*     (2018.01)

(52) U.S. Cl.
    CPC ..... *H05B 37/0218* (2013.01); *H05B 37/0227* (2013.01); *H05B 37/0272* (2013.01); *F21Y 2115/10* (2016.08); *H04W 4/005* (2013.01); *H04W 4/70* (2018.02)

(58) Field of Classification Search
    CPC ............ H05B 37/0227; H05B 33/0845; H05B 33/0854; H05B 33/0815; H05B 33/0863; H05B 33/0842; H05B 37/0281; H05B 37/0245
    See application file for complete search history.

(56) References Cited

U.S. PATENT DOCUMENTS

| | | |
|---|---|---|
| 8,058,750 B2 | 11/2011 | Covaro et al. |
| 8,159,156 B2 | 4/2012 | Henig et al. |
| 8,207,635 B2 | 6/2012 | Covaro |
| 8,248,230 B2 | 8/2012 | Covaro et al. |
| 8,344,641 B1 | 1/2013 | Isaacson et al. |
| 8,390,441 B2 | 3/2013 | Covaro et al. |
| 8,427,300 B2 | 4/2013 | Covaro et al. |
| 8,493,005 B2 | 7/2013 | Warton |
| 8,662,734 B2 | 3/2014 | Covaro |
| 8,706,310 B2 | 4/2014 | Barrilleaux |
| 8,710,759 B1 | 4/2014 | Isaacson et al. |
| 8,710,772 B2 | 4/2014 | Henig et al. |
| 8,729,835 B2 | 5/2014 | Henig et al. |
| 8,742,680 B2 | 6/2014 | Cowburn |
| 8,890,663 B2 | 11/2014 | Covaro et al. |
| 8,890,679 B2 | 11/2014 | Covaro et al. |
| 9,155,171 B1 | 10/2015 | Hughes |
| 9,295,142 B1 | 3/2016 | Leinen et al. |
| 2006/0266273 A1 | 11/2006 | Westberg et al. |
| 2009/0066486 A1 | 3/2009 | Kiekbusch et al. |
| 2009/0322250 A1 | 12/2009 | Zulim et al. |
| 2010/0102734 A1 | 4/2010 | Quick et al. |
| 2011/0199004 A1 | 8/2011 | Henig et al. |
| 2011/0273108 A1 | 11/2011 | Sivertsen |
| 2012/0223650 A1 | 9/2012 | Radermacher |
| 2012/0271477 A1 | 10/2012 | Okubo et al. |
| 2012/0275084 A1 | 11/2012 | Familiant et al. |
| 2012/0313544 A1 | 12/2012 | Shimomura et al. |
| 2013/0107041 A1 | 5/2013 | Norem et al. |
| 2013/0119892 A1 | 5/2013 | Feri et al. |
| 2013/0144448 A1 | 6/2013 | Luerkens et al. |
| 2013/0151025 A1 | 6/2013 | Wendt et al. |
| 2013/0159754 A1 | 6/2013 | Wendt |
| 2013/0193873 A1 | 8/2013 | Isaacson et al. |
| 2014/0232299 A1 | 8/2014 | Wang |
| 2014/0371876 A1 | 12/2014 | Isaacson |
| 2016/0020910 A1 | 1/2016 | Jones et al. |
| 2016/0036268 A1 | 2/2016 | Laherty |
| 2016/0212828 A1 | 7/2016 | Leinen et al. |

FOREIGN PATENT DOCUMENTS

| | | |
|---|---|---|
| CN | 205640789 U | 10/2016 |
| JP | 2013093323 A | 5/2013 |
| WO | 2014002073 A1 | 1/2014 |
| WO | 2014024064 A2 | 2/2014 |
| WO | 2014024072 A2 | 2/2014 |
| WO | 2014033575 A1 | 3/2014 |
| WO | 2014045154 A1 | 3/2014 |
| WO | 2014060890 A2 | 4/2014 |
| WO | 2014162279 A1 | 10/2014 |
| WO | 2014198533 A2 | 12/2014 |
| WO | 2014206797 A1 | 12/2014 |
| WO | 2015144457 A1 | 10/2015 |

OTHER PUBLICATIONS

Brossart et al., "Ember" Final Paper, Apr. 29, 2013.
Boyce et al. "Ember, Power of Ethernet LED Lighting," Final Presentation, May 13, 2013.
"A Comparison of CommScope's Redwood intelligent Lighting network and Power of Ethernet (PoE) Lighting Control Systems," Commscope White Paper; www.commscope.com, WP-107766.1-EN (Apr. 2014).
PCT International Search Report and Written Opinion from PCT/US2017/060919 dated Mar. 1, 2018.

POWER OVER ETHERNET-BASED TRACK LIGHTING SYSTEM

CROSS-REFERENCE TO RELATED APPLICATIONS

This application claims priority to U.S. Provisional Patent Application Ser. No. 62/422,176, filed Nov. 15, 2016, titled "Power Over Ethernet-Based Track Lighting System," the entirety of which application is incorporated by reference herein.

FIELD OF THE DISCLOSURE

The present disclosure relates generally to lighting systems, and more particularly to an improved track lighting system employing Power over Ethernet (PoE) and light emitting diode (LED) lighting elements.

BACKGROUND OF THE DISCLOSURE

Power over Ethernet (PoE) is a technology for supplying low voltage current and data over a common point-to-point Ethernet network cable to locations with applications that require both mediums. In some cases, power is carried on the same conductors that carry data. In other cases, power is carried on dedicated conductors within the same cable. Applications that currently benefit from PoE technology include Voice over Internet Protocol (VoIP), Internet Protocol (IP) cameras, wireless local area networks (WLAN), Wireless Access Points (WAP), Building Automation Systems (BAS), and security and access control systems.

PoE currently has two standards: Institute of Electrical and Electronics Engineers (IEEE) 802.3af (the original PoE standard) and IEEE 802.3at (known as PoE plus), which provide, respectively, about 13 Watts and about 25.5 Watts of power to connected devices. PoE has several advantages over traditional power systems used in homes and commercial buildings. For example, PoE systems are relatively low voltage, thus eliminating the need to run expensive high voltage wiring and conduit for lighting. In addition, installation of PoE wiring can be faster than with traditional power systems because Ethernet cabling employs simple plug-in end connections.

Light emitting diode (LED) luminaires can benefit from connection to a PoE network. Recent advances have reduced the power required to operate LED luminaires to a point where network switches that are compliant with PoE standards such IEEE 802.3 at can supply the power required by the LED luminaires. In addition, proprietary specifications for PoE exist as well as new proposed standards that increase the power supplied to the PoE devices up to 90 Watts. In addition, digital Ethernet communications can be used to command the LED luminaires to dim and brighten, change color, as well as to report status such as lamp failure and energy consumption.

Track lighting is a common form of interior lighting, often used in commercial buildings. It can be found in retail spaces where the light fixtures, supported on a track, can be easily aimed toward a desired area in order to highlight or draw attention to certain aspects of displayed products. The track itself is typically a linear metal channel having one or two electrical circuits for supplying alternating current (AC) power to the multiple light fixtures (referred to as "track heads") that are connectable at any point along the length of the track.

In some cases, it is desirable to control the brightness of one or more individual track heads. With only one or two AC electrical circuits disposed in or on the track, it can be difficult to control the brightness of the individual track heads using conventional dimmers. Often conventional dimmers are limited to controlling all of the heads on the track together and at the same intensity, since they all receive power from the same AC electrical circuit.

Recent advances in general LED light fixtures have enabled precise digital control of illumination and color of the light emitted from LED light fixtures. Digital feedback of lamp health status is also possible. Applying digital control to a single permanently fixed LED luminaire is fairly straightforward, and the use of addressable wired communications protocols such as digital addressable lighting interface (DALI) (International Electrotechnical Commission (IEC) 62386) is commonly used. It is difficult, however, to apply this wired communications protocol to commonly available individual track heads because there is currently no way of connecting the wired digital signal to each head.

Attempts have been made to communicate with individual track heads using radio frequency (RF) transmission, however it is expensive to incorporate RF transceivers into every track head. In addition, managing a large wireless network of such track heads can result in undesired interference from other RF sources in the serviced space.

Attempts have also been made to incorporate a low voltage control data bus into the AC powered track channel using separate conductors. However due to the high voltage of AC powered track lighting which may be up to 277 VAC, this may result in a dangerous mix of low voltage NEC class 2 conductors with high voltage conductors in a single-track channel. Another disadvantage of using an AC powered track lighting system in combination with LED enabled track heads is that each track head must have its own separate AC to DC converter to convert the AC electrical current into DC current that the LEDs require. As a result, each track head will lose a substantial amount of energy due to the efficiency loss during the AC to DC conversion process, thereby reducing the amount of energy that may have been saved. Also, the AC to DC conversion circuitry is costly, adding to the cost of each track head.

Energy codes regulate how much light power can be installed in a space. This is commonly referred to as Lighting Power Density (LDP) and is measured as total Watts of installed lighting, whereas a specific space in a building may not exceed the LPD specified in the energy code. Recent energy codes have required the use of expensive AC current limiters to be installed in the electrical circuit of AC powered tracks to make sure that a user cannot exceed the LPD allowed for the section of track by adding additional track heads after the building has been approved.

Using LED lamps in general lighting fixtures has the advantage of saving energy since the LED lamps themselves have a much higher efficiency than incandescent lamps. LED lamps also produce the same amount of light as incandescent lamps, while using much less energy and producing less heat. Thus, it would be desirable to provide an improved track lighting system for LED luminaires. More particularly, it would be desirable to provide a track lighting system in which the individual LED luminaires on a particular track can be independently controlled, thus enabling independent adjustment of the brightness, color, etc. of specific LED luminaires (or groups of LED luminaires) separate from the remaining LED luminaires on the track.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a Power over Ethernet (PoE) track lighting system. In one embodiment, the PoE track lighting system may include a PoE power source equipment, a power and communication link coupled to the PoE power source equipment, a PoE enabled low voltage track channel, a track head electrically coupled to the PoE enabled low voltage track channel, and a PoE track interface (PTI) device electrically coupled to the PoE power source equipment and the PoE enabled low voltage track channel. The PoE enabled low voltage track channel may include a pair of power conductors and a pair of communication conductors. The track head may include a light emitting diode (LED), a pair of power conductors, and a pair of communication conductors for contacting the power and communication conductors of the PoE enabled low voltage track channel, respectively.

The PTI device may be coupled to the power and communication link for receiving a low voltage DC current signal and a digital communication signal from the PoE power source equipment. The PTI device may transmit the low voltage DC current and a second digital communication signal to the PoE enabled low voltage track channel. In use, the PTI device may (i) separate the received digital communication signal from the received low voltage DC current, (ii) transmit the low voltage DC current to the power conductors of the PoE enabled low voltage track channel, and (iii) convert the received digital communication signal to the second digital communication signal for transmission to the communication conductors of the PoE enabled low voltage track channel. In use, connecting the power conductors in the track head to the power conductors in the PoE enabled low voltage track channel transmits the low voltage DC current to the track head for illuminating the LEDs, and transmits the second digital communication signal to the track head.

A PoE track interface device is also disclosed. In one embodiment, the PoE track interface device may include an input connector, a microprocessor, and a track conductor. In use, the input connector may receive a power and communication link for receiving low voltage DC current and a digital communication signal from a PoE power source equipment. The microprocessor may be in electrical communication with the input connector. The microprocessor may be programmed to receive the digital communication signal from the input connector and convert the digital communication signal into a second digital communication signal. The track conductor may transmit the low voltage DC current to power conductors of a PoE enabled low voltage track channel, and to transmit the second digital communication signal to a communication conductor of the PoE enabled low voltage track channel. The second digital communication signal may be in the form of a protocol that is more suitable for transmission along the communication conductor of the PoE enabled low voltage track channel.

A method for enabling a PoE track lighting system is also disclosed. The method for enabling the PoE track lighting system may include supplying a low voltage DC current and digital communication signal via a power and communication link, separating the received digital communication signal from the received low voltage DC current, transmitting the low voltage DC current to power conductors of a PoE enabled low voltage track channel, converting the received digital communication signal to a second digital communication signal, and transmitting the second digital communication signal to communication conductors of the PoE enabled low voltage track channel.

BRIEF DESCRIPTION OF THE DRAWINGS

By way of example, specific embodiments of the disclosed device will now be described, with reference to the accompanying drawings, in which.

DETAILED DESCRIPTION

Figure 1:
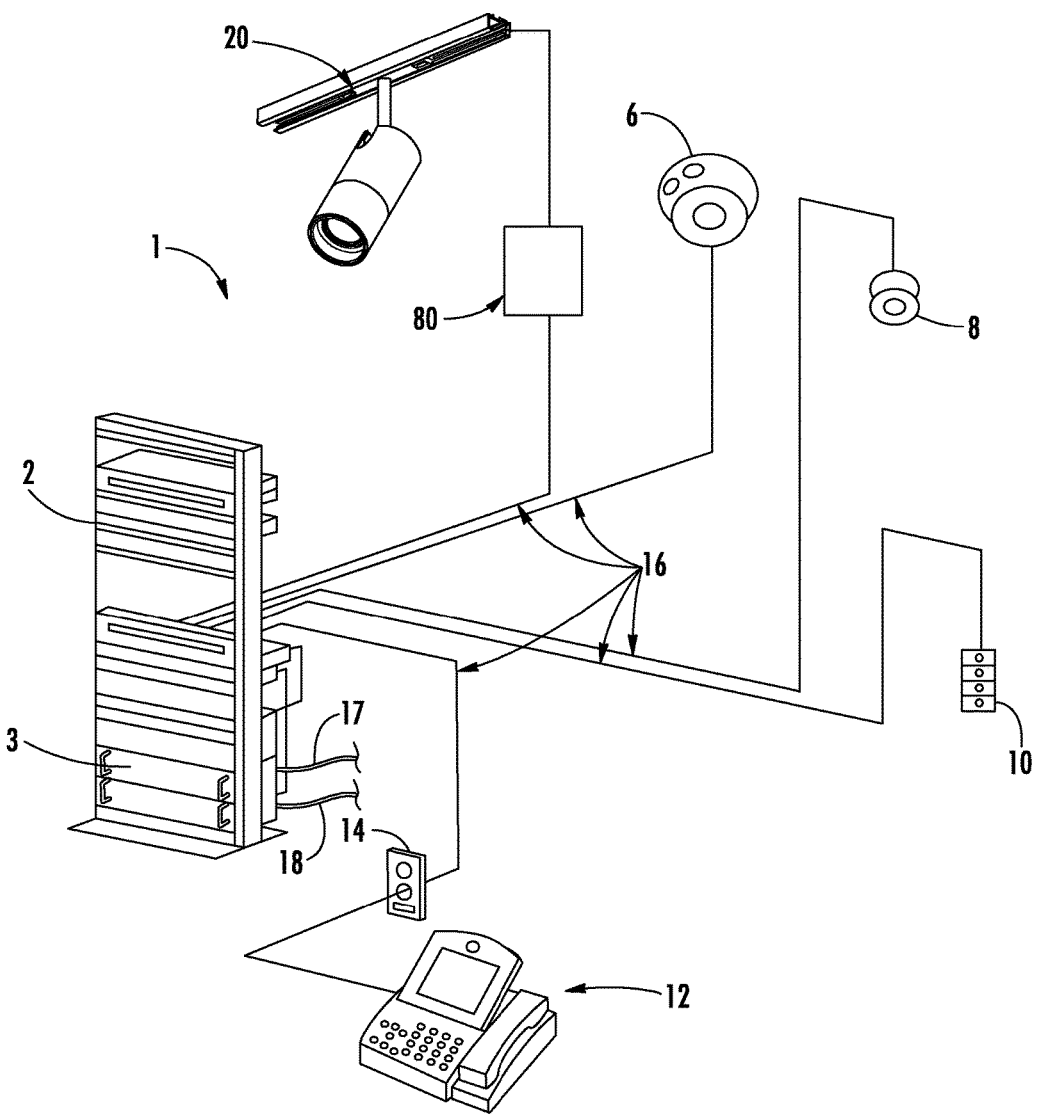
FIG. 1 is a schematic view of an exemplary PoE tracking lighting system according to the disclosure.

A system, one or more associated devices, and a method in accordance with the present disclosure will now be described more fully hereinafter with reference to the accompanying drawings, in which preferred embodiments of the devices, system and method are shown. The disclosed devices, system and method, however, may be embodied in many different forms and should not be construed as being limited to the embodiments set forth herein. Rather, these embodiments are provided so that this disclosure will be thorough and complete, and will fully convey the scope of the devices, system and method to those skilled in the art. In the drawings, like numbers refer to like elements throughout.

The present disclosure relates to a system that utilizes Power over Ethernet (PoE) to supply low voltage direct current (DC) power to a track lighting system. The system also facilitates digital communications with the individual track heads so that, for example, operational characteristics of the individual track heads can be controlled (e.g., dim, brighten, change color), so that feedback on functional status of individual track heads can be obtained, and so that total system current can be regulated. The PoE track lighting system may include a PoE track interface (PTI) device that can receive PoE low voltage DC current and digital communication signals from a PoE switch or PoE midspan device (collectively referred to herein as a PoE power source equipment coupled to the PTI device via a power and communications link. A PoE enabled low voltage track channel may be provided with a pair of power conductors and an additional pair of low voltage communication conductors. The PTI device may receive the low voltage DC current from the PoE power source equipment via the power and communication link and may pass the low voltage DC current and the digital communication signals to the power and communication conductors, respectively, located within the PoE enabled low voltage track channel.

The PoE track lighting system may further include a plurality of track heads that may receive the low voltage DC current from the power conductors located in the PoE enabled low voltage track channel and supply the low voltage DC current to the LEDs with a minimum amount of power loss. The individual track heads can also receive a second digital communication signal via communication conductors located within the PoE enabled low voltage track channel and can use the second digital communication signal to, for example, control the operational characteristics (e.g., brightness, color) of the individual track heads. The track heads may also facilitate feedback regarding, for example, functional status of the LED lamps.

A sensing element capable of detecting occupancy of an area and/or detecting other environmental factors such as light level may be integrated into one or more of the track heads or the PTI device.

Alternatively, standalone sensing sensor(s) and other devices may include power and communication conductors to connect directly to the power and communication conductors, respectively, of the PoE enabled low voltage track channel. In some embodiments, one or more wireless transceivers may be directly connected to the PoE enabled low voltage track channel in a similar manner to provide one or more wireless communications link with a wireless remote sensor, wireless control station, wireless lighting system, etc.

Referring to FIG. 1, an exemplary PoE lighting system 1 is disclosed for supplying power to PoE powered devices. The PoE lighting system 1 may include a PoE power source equipment 2 (shown as a PoE switch) coupled to one or more PoE powered devices. The PoE powered devices may be in the form of an LED light fixture such as a PoE enabled track lighting fixture 20. In some embodiments, the PoE lighting system 1 may further include separate and distinct PoE powered devices such as, for example, an occupancy sensor 6, a photodetector 8, a wall switch 10, etc., each of which may be coupled to the PoE power source equipment 2 via a separate power and communication link 16. It will be appreciated that although the illustrated embodiment illustrates a single occupancy sensor 6, photodetector 8, wall switch 10, etc., the system 1 can include multiples of each device coupled directly or indirectly to the PoE power source equipment 2. In some embodiments, the PoE power source equipment 2 may also be coupled to communication stations such as an IP phone 12 via a wall plate 14.

The power and communication link 16 between the PoE power source equipment 2 and each of the individually connected PoE powered devices may be an appropriate Ethernet cable. In some non-limiting exemplary embodiments, the Ethernet cable is a CAT5E cable, a CAT6 cable, or any other cable type capable of carrying power and communication signals. Connections between the power and communication links 16 and associated PoE powered devices may, for example, be via suitable connectors such as RJ45 connectors. Alternatively, in some embodiments, one or more powered device(s) may be low voltage devices that do not connect to the PoE power source equipment 2 via an Ethernet cable, but rather connect to the system via another appropriate low voltage wiring.

The PoE power source equipment 2 may include a line power connection 18 for receiving power from a building power source. As will be understood, the PoE power source equipment 2 can be a network switch that has PoE injection (i.e., power injection) built in. That is, the PoE power source equipment 2 takes in line power, conditions it, and injects it onto one or more conductors of the power and communication link 16 to the connected PoE powered devices. The PoE power source equipment 2 may also include a network connection 17 for receiving and transmitting control signals and other data from one or more remote control systems such as a building automation system (BAS). The BAS can be used to monitor and/or control one or more PoE powered devices of the PoE lighting system 1 via the associated power and communication links 16. In the illustrated embodiment, the PoE lighting system 1 can include a line power supply interface 3 for providing power to the PoE power source equipment 2 either directly or via a power distribution unit.

For purposes of the present disclosure, attention will now be directed to the PoE enabled track lighting system 20 and how the components thereof are arranged and configured to operate in a PoE lighting system, such as, the one illustrated in FIG. 1. Referring to FIGS. 1-7, an exemplary embodiment of the PoE enabled track lighting system 20 in accordance with the present disclosure is shown. The PoE enabled track lighting system 20 may include a PoE enabled low voltage track channel 30, a track head 40 and a PTI device 80. As will be described in greater detail below, the track head 40 may include a track adapter 60. While the exemplary PoE enabled track lighting system 20 shown in FIGS. 1-4 is shown as including a single track head 40, it will be appreciated that additional track heads 40 may be selectively installed along the length of the PoE enabled low voltage track 30 without departing from the present disclosure.

Figure 7:
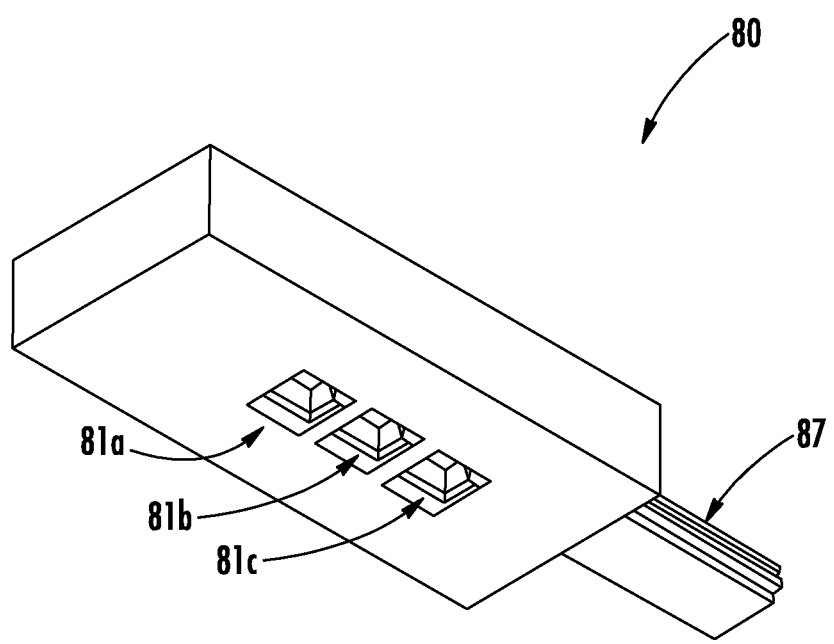
FIG. 7 is a perspective view of an exemplary embodiment of a PoE track interface (PTI) device that may be used in connection with the PoE tracking lighting system in FIG. 1.

Referring to FIGS. 1 and 7, the PTI device 80 resides in between the PoE power source equipment 2 and the PoE enabled low voltage track channel 30 (FIGS. 2-4) of the POE enabled track lighting fixture 20 so that the PTI device 80 may receive PoE low voltage DC current and digital communication signals from the PoE power source equipment 2 via the power and communication link 16 and may pass the low voltage DC current and digital communication signals to the PoE enabled low voltage track channel 30. Referring to FIG. 7, in one exemplary embodiment, the PTI device 80 may be a separate component and include an integrated track conductor 87, the track conductor 87 being arranged and configured to engage an end of the PoE enabled low voltage track channel 30. By forming the PTI device 80 as a separate component, the PoE enabled track lighting system 20 may be used in retrofit applications by connecting the PTI device 80 to the end of the PoE enabled low voltage track channel 30 and coupling the PTI device 80 to the PoE power source equipment 2 via a power and communication links 16. In an alternative exemplary embodiment, the PTI device 80 may be integrated into the PoE enabled low voltage track channel 30. That is, the PTI device 80 may be embedded incorporated into the PoE enabled low voltage track channel 30. In this manner, a user may couple the PoE enabled low voltage track channel 30 to the PoE power source equipment 2 via a power and communication links 16.

As will be described in greater detail below, the PTI device 80 may include first, second and third PoE input connectors 81*a*, 81*b*, 81*c* such as, for example, RJ45 connectors, for receiving low voltage DC current from a plurality of PoE power source equipment 2. Each of the input connectors 81*a*, 81*b*, 81*c* may be coupled to a respective power and communication link 16 for receiving low voltage DC current and digital communication signals from the PoE power source equipment 2. Although the PTI device 80 is shown as including three input connectors 81*a*, 81*b*, 81*c*, it is contemplated that the PTI device 80 may include more or less input connectors without departing from the present disclosure.

The low voltage DC current received from the one or more PoE power source equipment 2 is eventually passed on to the track conductor 87. The track conductor 87 may be arranged and configured to engage an end of the PoE enabled low voltage track channel 30. That is, the track conductor 87 is sized and configured to be slidably received within an end of the PoE enabled low voltage track channel 30 so that the power conductors of the PTI device 80 contact and transmit the low voltage DC current from the PTI device 80 to the power conductors 34, 35 (FIGS. 6A and 6B) of the PoE enabled low voltage track channel 30. Similarly, communication conductors of the track conductor 87 of the PTI device 80 contact and communicate the second digital communication signal to the communication conductors 36, 37 of the PoE enabled low voltage track channel 30.

Alternatively, the PTI device 80 may be located anywhere else in the system 1 in between the PoE power source equipment 2 and the PoE enabled low voltage track channel 30. For example, the PTI device 80 may be configured as a wall mounted device or a ceiling mounted device. In these embodiments, the PTI device 80 may be coupled to the PoE enabled low voltage track channel 30 via a power and communication link 16 for transferring the low voltage DC current and digital communication signals from the PTI device 80 to the PoE enabled low voltage track channel 30. Alternatively, the PTI device 80 may be coupled to the PoE enabled low voltage track channel 30 at an intermediate portion. For example, the PTI device 80 may be coupled to a track adapter 60 for coupling to the PoE enabled low voltage track channel 30.

In some cases, as will be described in greater detail below, the maximum PoE power supplied by one PoE power source equipment 2 and associated power and communication link 16 may not be sufficient to operate all desired track heads 40 and any other associated PoE powered devices. Thus, the PTI device 80 may be coupled to power and communication links from multiple PoE power source equipment. The PTI device 80 may combine the DC current from each PoE power source equipment to produce and deliver a higher power DC current to the PoE enabled low voltage track channel 30.

As Ethernet is designed to operate in specially designed cable such as, for example, CAT6 cable, Ethernet will not work well on an open conductor inside the PoE enabled low voltage track channel 30. That is, Ethernet cannot simply be placed on the power and communication conductors of a conventional, prior art track channel. As such, the PTI device 80 will receive the low voltage DC current and digital communication signal from the PoE power source equipment 2 and separate the digital communication signal from the low voltage DC current. Next, the PTI device 80 may transmit the low voltage DC current to the power conductors of the PoE enabled low voltage track channel 30 and convert the received digital communication signal into a different protocol, one more suited for transmission via the communication conductors of the PoE enabled low voltage track channel 30. Thus, the PTI device 80 will receive the low voltage DC current via one or more PoE input connector(s) and transmit the low voltage DC current to the power conductors of the PoE enabled low voltage track channel 30. In addition, the PTI device 80 may receive the digital communication signal via the one or more PoE input connector(s) and decode and transmit the digital communication signals to the communication conductors of the PoE enabled low voltage track channel 30. For example, utilizing a microprocessor contained inside of the PTI device 80, the PTI device 80 will receive and decode the Ethernet PoE digital communication signal utilizing a suitable TCP/IP based protocol such as Constrained Application Protocol (CoAP) into a more suitable second digital communication signal to provide control and monitoring of each track head 40 individually or as a group. The PTI device 80 may convert the received digital communication signal to the second digital communication signal that utilizes a protocol that is more suitable for transmission along the open conductors such as, for example, DALI, DMX, Modbus, etc. and then transmit the second digital communication signal to the communication conductors of the PoE enabled low voltage track channel 30. As will be described in greater detail below, since the PoE enabled low voltage track channel 30 includes an additional pair of conductors, the PoE enabled low voltage track channel 30 will not suffer from the same deficiencies as prior art systems that mix 277v with class 2 conductors.

Figure 2:
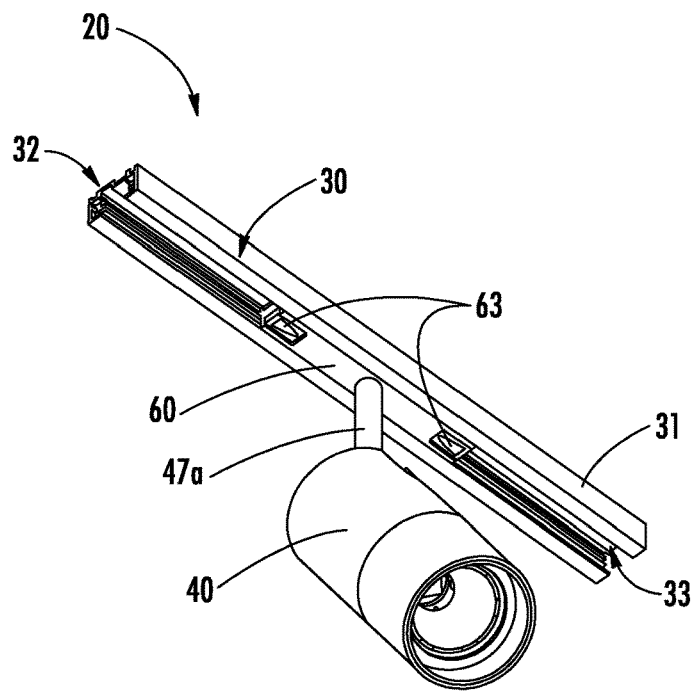
FIG. 2 is a perspective view of an exemplary PoE track head coupled to a PoE enabled low voltage track channel according to the system of FIG. 1.
Figure 3:
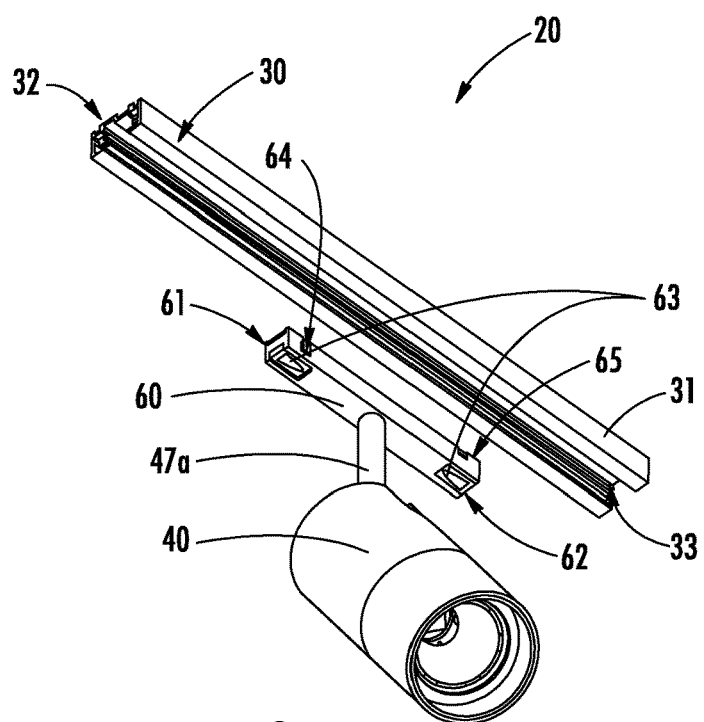
FIG. 3 is an exploded, perspective view of the exemplary PoE track head illustrated in FIG. 2, the track head being illustrated as being decoupled from the PoE enabled low voltage track channel.
Figure 6A:
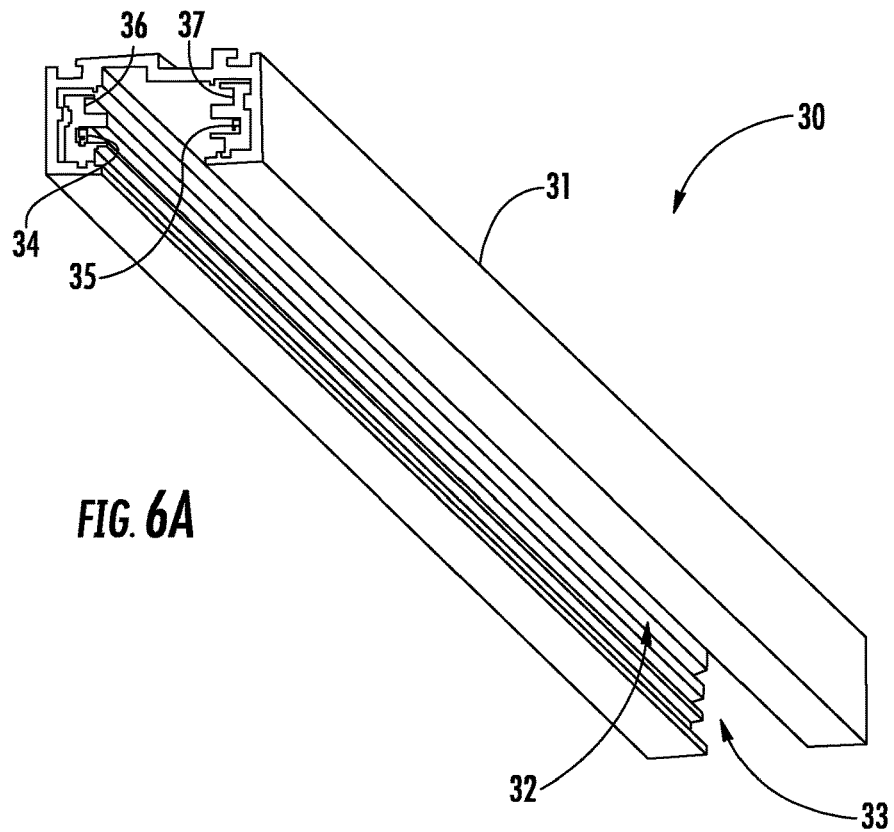
FIG. 6A is a frontal, perspective view of an exemplary PoE enabled low voltage track channel according to the system of FIG. 1.
Figure 6B:
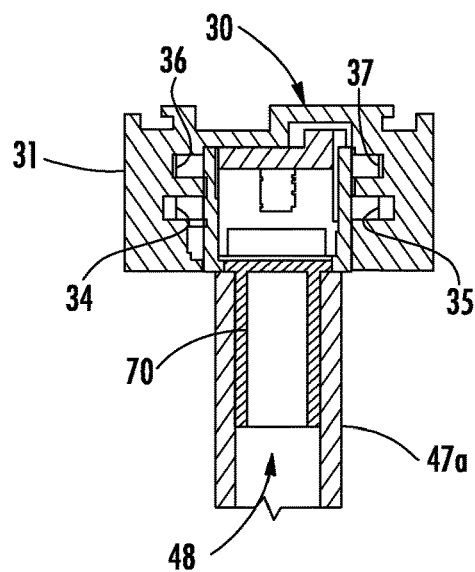
FIG. 6B is a cross-sectional view taken through the PoE enabled low voltage track channel shown in FIG. 6A with a partial view of a track head coupled thereto.

Referring to FIGS. 6A-6B, the PoE enabled low voltage track channel 30 may include a housing 31 having a generally rectangular transverse cross-section forming a hollow interior cavity 32 that may be open at both ends and through a longitudinal slot 33 in the top wall of the housing 31. The hollow interior cavity 32 may be sized and configured to receive the track adapter 60 (FIG. 2). Therein, as previously mentioned, the PoE enabled low voltage track channel 30 includes a pair of low voltage DC power conductors 34, 35 extending along the length of the PoE enabled low voltage track channel 30, and a pair of digital communication conductors 36, 37 extending along the length of the PoE enabled low voltage track channel 30. Thus arranged, the power and communication conductors 34, 35, 36, 37 may be accessed at any point along the length of the PoE enabled low voltage track channel 30. This permits the track adapter 60 and hence the track heads 40 to be selectively connected to the power and communication conductors 34, 35, 36, 37 at any desired location along the PoE enabled low voltage track channel 30.

As previously mentioned, the power and communication conductors 34, 35, 36, 37 may be coupled to the PoE power source equipment 2 via the PTI device 80 (FIG. 1) for supplying low voltage DC current and digital communication signals to the track heads 40. The power conductors 34, 35 of the PoE enabled low voltage track channel 30 may be configured to supply 48v, although this is merely an example and other low voltages are contemplated without departing from the present disclosure. The housing 31 may be made from any suitable non-conductive material. In one exemplary embodiment, the PoE enabled low voltage track channel 30 may be a DC controlled PoE enabled low voltage track channel. The PoE enabled low voltage track channel preferably is capable of supplying 48v, however, it will be appreciated that other PoE enabled low voltage track channels are contemplated including PoE enabled low voltage track channels that can supply more or less voltage.

Referring to FIGS. 2-5, an exemplary embodiment of the track head 40 is shown. In use, each individual track head 40 may receive the low voltage DC current from the power conductors 34, 35 located in the PoE enabled low voltage track channel 30 and supply the current to an LED Driver to power and illuminate the LEDs 42 (FIG. 5) for illuminating the track heads 40.

Each individual track head 40 may also be coupled to the communication conductors 36, 37 located in the PoE enabled low voltage track channel 30 to receive the second digital communication signal that is present on the communication conductors 36, 37. Each individual track head 40 may utilize this data to control the operative properties of the LEDs 42 such as but not limited to brightness or color, and may also provide feedback on functional status of the LEDs or any other aspect of the track head 40. It should be understood however that the present disclosure is not limited to any one particular type of PoE enabled low voltage track channel and that any suitable PoE enabled low voltage track channel now known or hereafter developed can be used in connection with the PoE lighting system 1.

Figure 4:
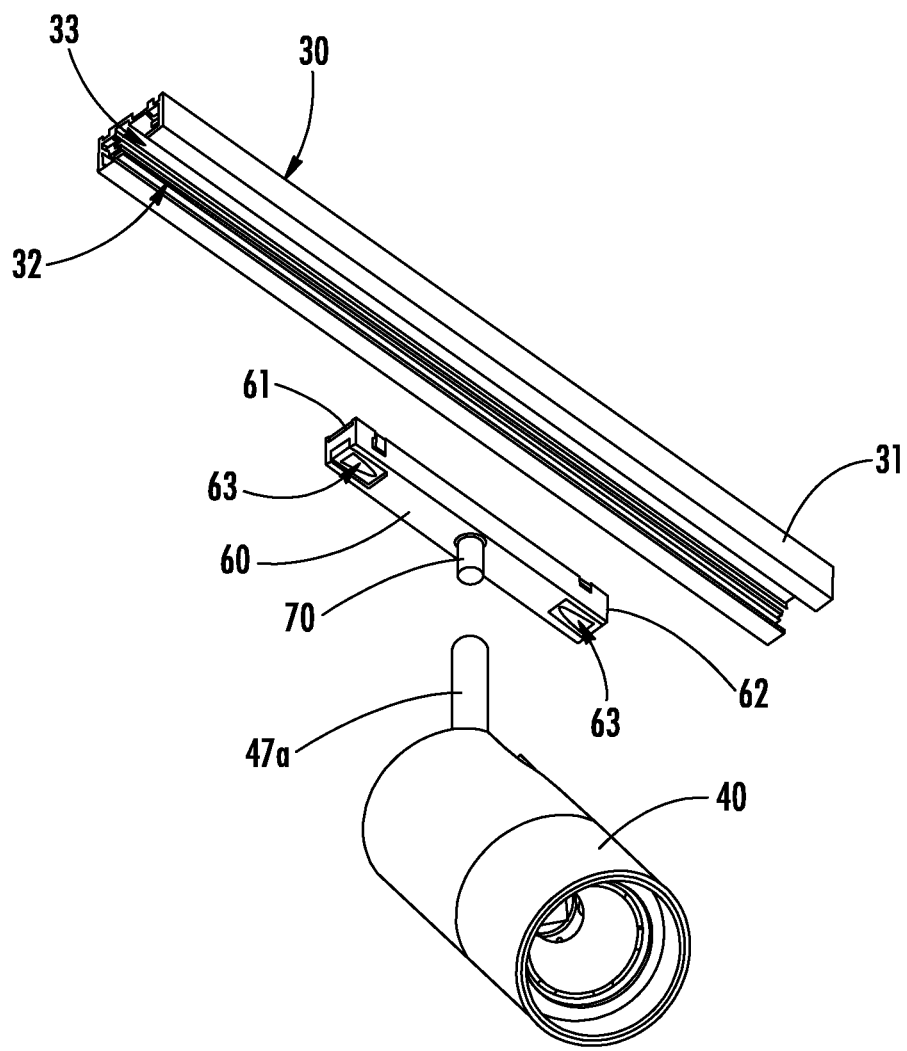
FIG. 4 is an exploded, perspective view of the exemplary PoE track head illustrated in FIG. 2, the track head being illustrated as being decoupled from the track adapter.
Figure 5:
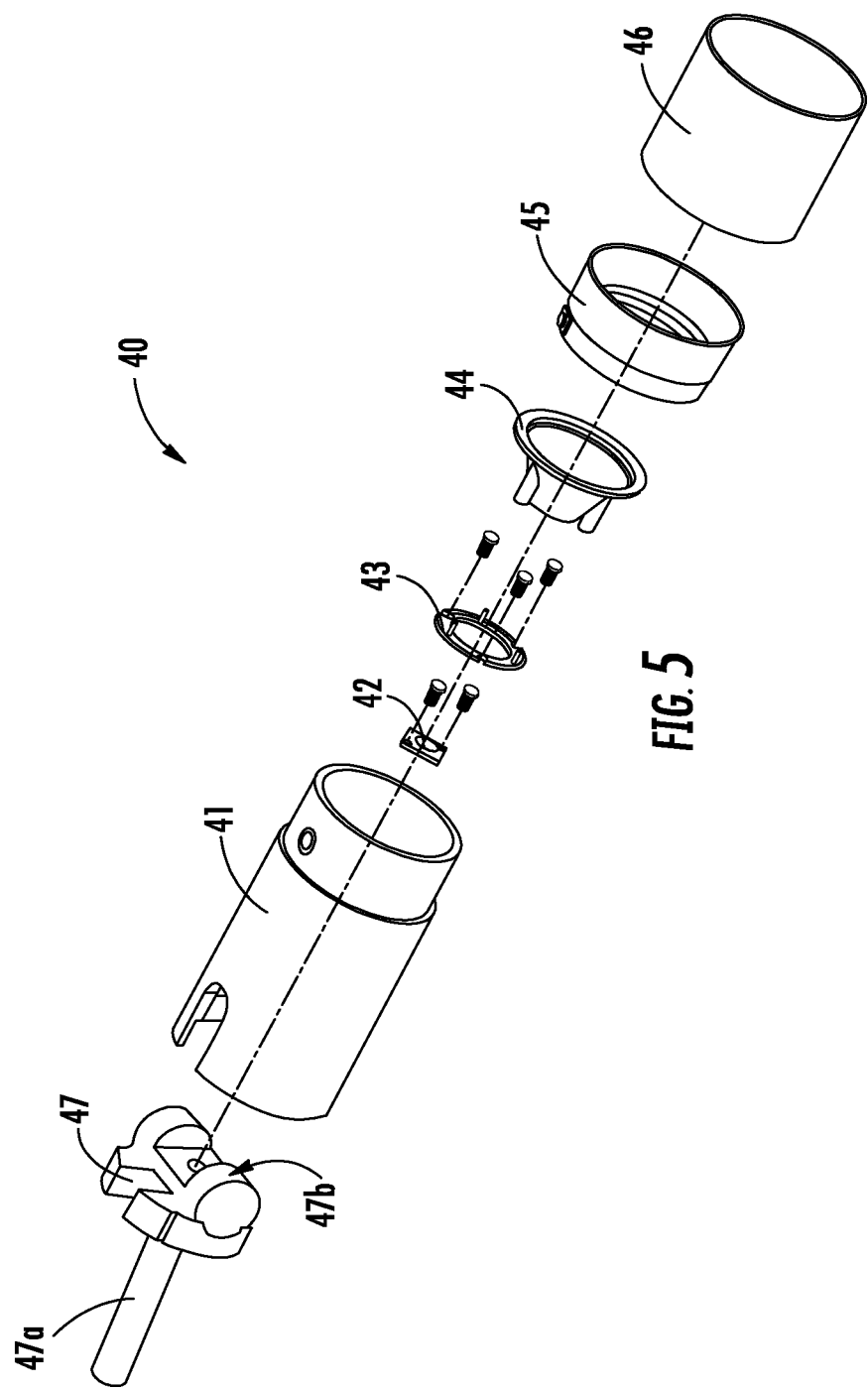
FIG. 5 is an exploded, perspective view of the exemplary track head illustrated in FIG. 2.

As best seen in FIG. 5, the track head 40 may include a track adapter 60 (FIGS. 2-4), a housing 41, an LED Driver (not shown), LEDs 42, a holder 43 for securing LEDs 42 to the housing 41, a reflector 44 and an optic holder 45 for directing the distribution of light from the LEDs, a cap 46 and a connector 47. The connector 47 may further include a rearward extending projection 47a for engaging the track adapter 60 and a curved end portion 47b opposite thereof for facilitating rotation of the track head 40 with respect to the track adapter 60 and hence with respect to the PoE enabled low voltage track channel 30 so that the track head 40 can be positioned in a desired orientation. The curved end portion 47b may permit approximately 90 degrees of vertical rotation, although the track head 40 may be permitted to rotate more or less without departing from the present disclosure. The LEDs 42 may be any lighting emitting diode now known or hereafter developed including, but not limited to one or more light-emitting diodes mounted on a printed circuit board, a Chip-On-Board (COB) design, etc. Although the track head 40 has been shown to have a generally cylindrical shape, other shapes and sizes may be used without departing from the present disclosure.

The track adapter 60 is adapted and configured to couple the track head 40 to the PoE enabled low voltage track channel 30. As shown in FIG. 4, the track adapter 60 may include an outwardly extending threaded stud 70 for engaging an internally threaded bore 48 (FIG. 6B) formed in the projection 47a, although the track head 40 may be coupled to the track adapter 60 by any other means now known or hereafter developed.

The track adapter 60 may be releasably coupled to the PoE enabled low voltage track channel 30 so that the track adapter 60, and hence the track head 40 coupled thereto, can be selectively connected and disconnected from the PoE enabled low voltage track channel 30 as desired, anywhere along the length of the PoE enabled low voltage track channel 30. The track adapter 60 may include any mechanism for releasably coupling to the PoE enabled low voltage track channel 30. In the non-limiting exemplary embodiment shown, the track adapter 60 may include a pair of buttons 63 located at the first and second ends 61, 62 thereof. In use, depressing the buttons 63 may retract an outward extending projection (not shown) so that the track adapter 60 may be inserted into the interior hollow cavity 32 of the PoE enabled low voltage track channel 30. Once properly located, the buttons 63 may be released, which in turns releases the projections located in the track adapter 60 so that they may engage a corresponding longitudinal recess formed in the PoE enabled low voltage track channel 30.

The track adapter 60 may also include a pair of power conductors 64 and a pair of communication conductors 65 for contacting the power and communication conductors 34, 35, 36, 37 located in the PoE enabled low voltage track channel 30, respectively. As shown, the power conductors 64 may be located adjacent to the first end 61 while the communication conductors 65 may be located adjacent the second end 62 of the track adapter 60, although the location and size of the power conductors 64 and communication conductors 65 may be altered without departing from the present disclosure.

As will be readily appreciated, connecting the track adapter 60 to the PoE enabled low voltage track channel 30 will place the power conductors 64 of the track adapter 60 into electrical contact with the power conductors 34, 35 located within the PoE enabled low voltage track channel 30 so that the low voltage DC power from the power conductors 34, 35 located within the PoE enabled low voltage track channel 30 can power the LED driver, which can power and illuminate the LEDs 42 located in the track head 40. In addition, connecting the track adapter 60 to the PoE enabled low voltage track channel 30 will place the communication conductors 65 of the track adapter 60 into electrical contact with the communication conductors 36, 37 located within the PoE enabled low voltage track channel 30 so that the second digital communication signal (e.g., control signals to dim, brighten, change color, status information, energy consumption, etc.) from the communication conductors 36, 37 located within the PoE enabled low voltage track channel 30 can be transferred to and from the individual track heads 40. It should be understood however that the present disclosure is not limited to any one particular type of track head and that any suitable track head now known or hereafter developed can be used in connection with the PoE lighting system 1.

Figure 8:
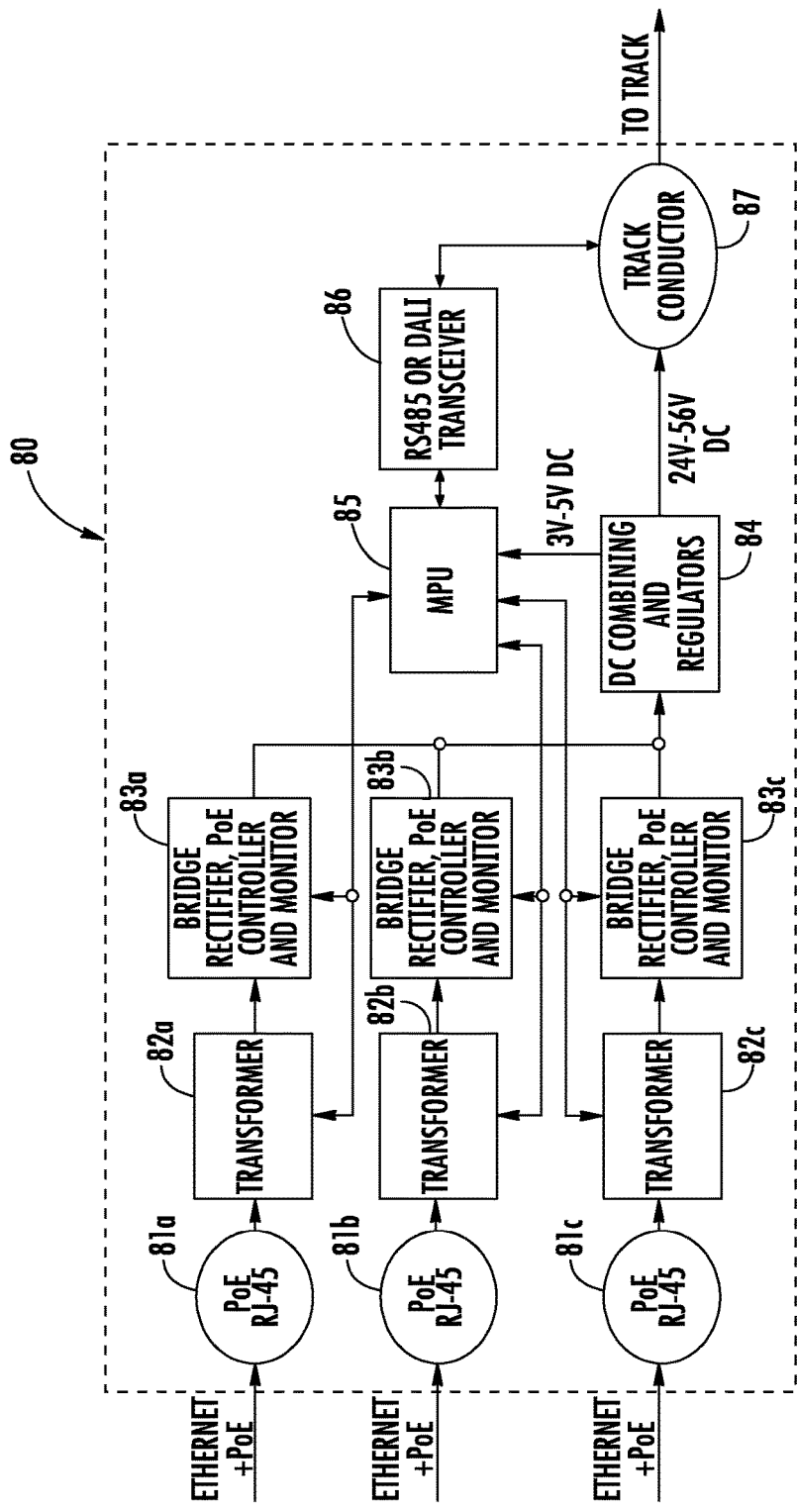
FIG. 8 is a schematic diagram of the exemplary PTI device illustrated in FIG. 7.

Referring now to FIG. 8, a schematic diagram of an exemplary PTI device 80 is illustrated. As shown, the PTI device 80 may include input connectors 81a, 81b, 81c, transformers 82a, 82b, 82c, bridge rectifier 83a, 83b, 83c, a DC current combiner 84, a microprocessor 85, a transceiver 86 and a track conductor 87 for contacting and transmitting the low voltage DC current from the PTI device 80 to the power conductors 34, 35 of the PoE enabled low voltage track channel 30 and for contacting and communicating the second digital communication signals to the communication conductors 36, 37 of the PoE enabled low voltage track channel 30, as previously described.

As shown and as previously mentioned, the PTI device 80 may include three PoE input connectors 81a, 81b, 81c such as, for example, RJ45 connectors, for receiving low voltage DC current from a plurality of PoE power source equipment 2. Each of the input connectors 81a, 81b, 81c may be coupled to a respective power and communication link 16 for receiving low voltage DC current and digital communication signals from the PoE power source equipment 2. Although the PTI device 80 is shown as including three input connectors 81*a*, 81*b*, 81*c*, it is contemplated that the PTI device 80 may include more or less input connectors without departing from the present disclosure. For example, the PTI device 80 may include a single port, dual ports, or four ports and more. The low voltage DC current received from the PoE power source equipment 2 is then passed through the transformers 82*a*, 82*b*, 82*c* and bridge rectifier 83*a*, 83*b*, 83*c* to the DC current combiner 84, which as necessary combines the DC current from each input connector 81*a*, 81*b*, 81*c* to produce and may deliver a higher power DC current to the PoE enabled low voltage track channel 30. The track conductor 87 is arranged and configured to output the DC current to the power conductors 34, 35 (FIGS. 6A and 6B) of the PoE enabled low voltage track channel 30 and to output the second digital communication signal to the communication conductors 36, 37 of the PoE enabled low voltage track channel 30. While the input connectors 81*a*, 81*b*, 81*c* have been labeled as input connectors and the track conductor 87 has been labeled as a track conductor, it should be noted that the system may be capable of providing bi-directional communication, for example, the PTI device 80 may be capable of receiving, for example, lamp status information and energy consumption information and relaying this information to the PoE power source equipment 2 for communication with a remote device.

As previously mentioned, the microprocessor 85 located in the PTI device 80 controls the circuity so that the PTI device 80 may receive the low voltage DC current and digital communication signals from the PoE power source equipment 2 via the power and communication link 16 and may pass the low voltage DC current and digital communication signals to the PoE enabled low voltage track channel 30. In some embodiments, the microprocessor 85 facilitates and controls the separating out of the digital communication signal from the low voltage DC current. The low voltage DC current is transmitted to the power conductors 34, 35 of the PoE enabled low voltage track channel 30. In addition, the microprocessor 85 converts the data communication signal into a more suitable protocol for transmitting onto the communication conductors 36, 37 of the PoE enabled low voltage track channel 30. Thus, the microprocessor 85 receives the Ethernet PoE data communication signal and decodes the Ethernet PoE data communication signal into control information in the form of a second digital communication signal that utilizes a protocol more suitable for transmission via the PoE enabled low voltage track channel 30. For example, utilizing a suitable TCP/IP based protocol such as Constrained Application Protocol (CoAP), the microprocessor 85 may convert the received digital communication signal into the second digital communication signal, which may be in the form of DALI, DMX, Modbus, etc. and then utilizing the transceiver 86, transmits the second digital communication signal to the communication conductors 36, 37 of the PoE enabled low voltage track channel 30.

The microprocessor 85 in the PTI device 80 may also be in communication with a current sensing element (not shown) configured to coordinate the combining of PoE connections and/or to monitor the current drawn by the PoE enabled track lighting system 20 to facilitate current limiting to satisfy energy codes and power monitoring.

In addition, while the PTI device 80 has been described and illustrated in connection with a PoE enabled track lighting system, one skilled in the art will appreciate that the PTI device 80 may also be used without a PoE enabled low voltage track channel to supply DC power and data directly to a non-track connected lighting device or other device requiring higher DC power than a single PoE connection to a power source equipment may provide.

Figure 9:
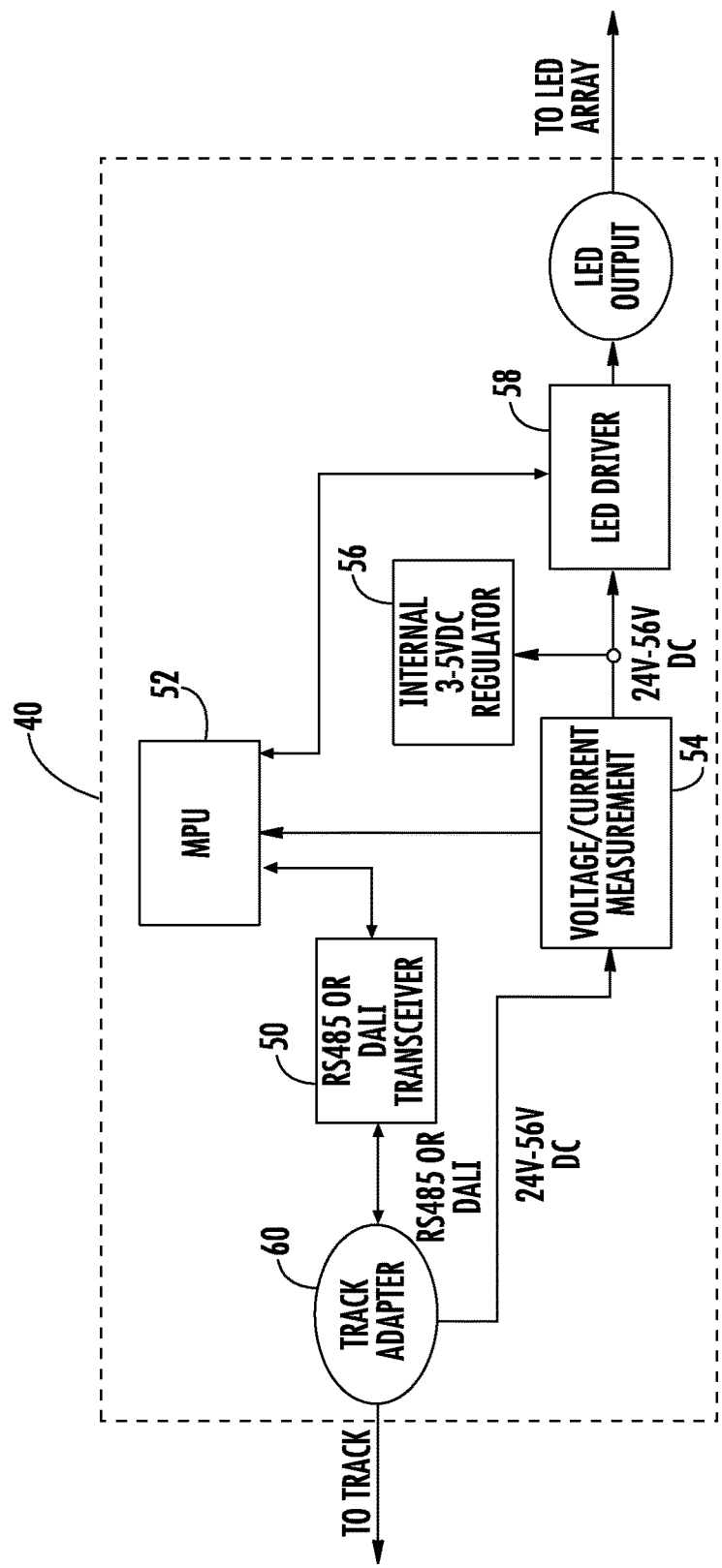
FIG. 9 is a schematic diagram of an exemplary track head with LED driver.

Referring to FIG. 9, a schematic diagram of an exemplary track head including an LED driver that may be used in connection with the PoE lighting control system 1 is disclosed. As shown, the track head 40 may include a transceiver 50, a microprocessor 52, an LED driver 58 for powering and illuminating the LEDs, and a voltage regulator 56 for maintaining a constant voltage. The transceiver 50 may be electrically coupled to the track adapter 60 so that the transceiver 50 can bi-directionally communicate with the PTI device 80 (FIG. 8). Specifically, the transceiver 50 may receive, inter alia, the second digital communication signal from the PTI device 80 via the PoE enabled low voltage track channel 30 and track adapter 60. In this manner, the track head 40 is capable of receiving, inter alia, the necessary control information to illuminate, dim, brighten, change color, etc. In addition, the transceiver 50 enables the track head 40 to report status, such as, for example, lamp failure and energy consumption. The transceiver 50 may be, for example, an RS485, DALI, or other appropriate protocol transceiver.

The track head 40 may also include a microprocessor 52 electrically coupled to the transceiver 50 and the LED driver 58. In this manner, the microprocessor 52 may receive and decode the second digital communication signal and relay the control signals to the LED driver 58. The LED driver 58 may condition the low voltage DC current. In addition, the LED driver 58 may receive and implement the control signals received from the microprocessor 52, and may control the connected LEDs 42 (FIG. 5) in accordance with those signals. The track head 40 may also include a current sensing element 54 to monitor the current drawn by the track head 40 to facilitate current limiting to satisfy energy codes and power monitoring.

Figure 10:
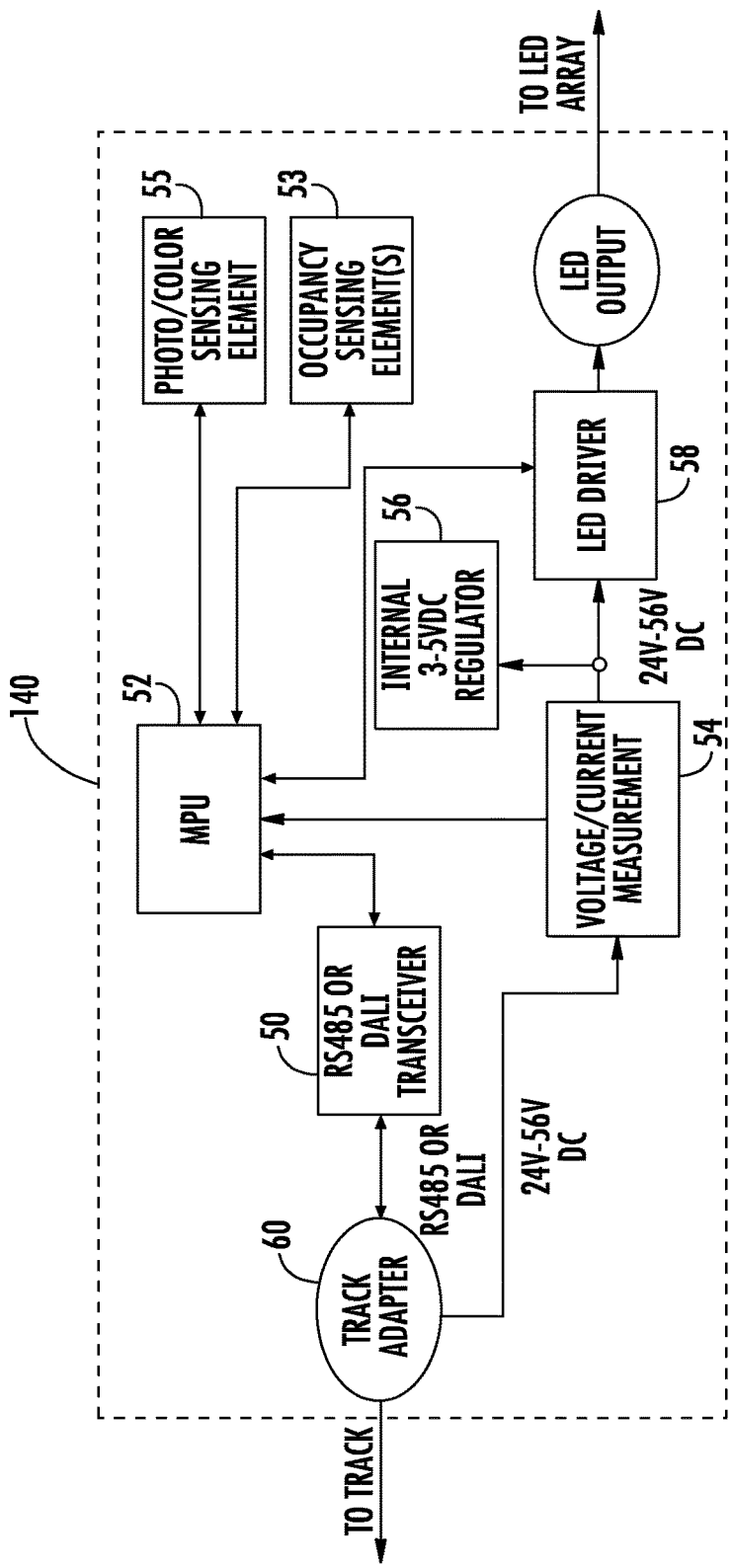
FIG. 10 is a schematic diagram of an alternate exemplary track head with LED driver, the track head further incorporating additional sensing elements.

Referring to FIG. 10, a schematic diagram of an alternative exemplary track head 140 including an LED driver that may be used in connection with the PoE lighting control system 1 is disclosed. The track head 140 illustrated in FIG. 10 may be substantially identical to the track head 40 described in FIG. 9 except as provided herein. The track head 140 may also incorporate a sensing element 53, 55 such as, for example, an occupancy sensor 53 for detecting the presence or absence of a person in the area and/or a light detector 55 for detecting the light level in the area being monitored. The sensing element 53, 55 may be electrically coupled to the microprocessor 52 for sending, for example, occupancy information and light level information to the microprocessor 52, which, in turn, processes the information and relays applicable control signals to the LED driver 58. While FIG. 10 depicts the sensing elements 53, 55 as being an occupancy sensor and light level detector, respectively, it is contemplated that the track head 140 may include an occupancy sensor without the light detector, and vice versa. In addition, it is contemplated that other sensing elements may also be incorporated in lieu of or in combination with the occupancy sensor and light level detector.

Figure 11:
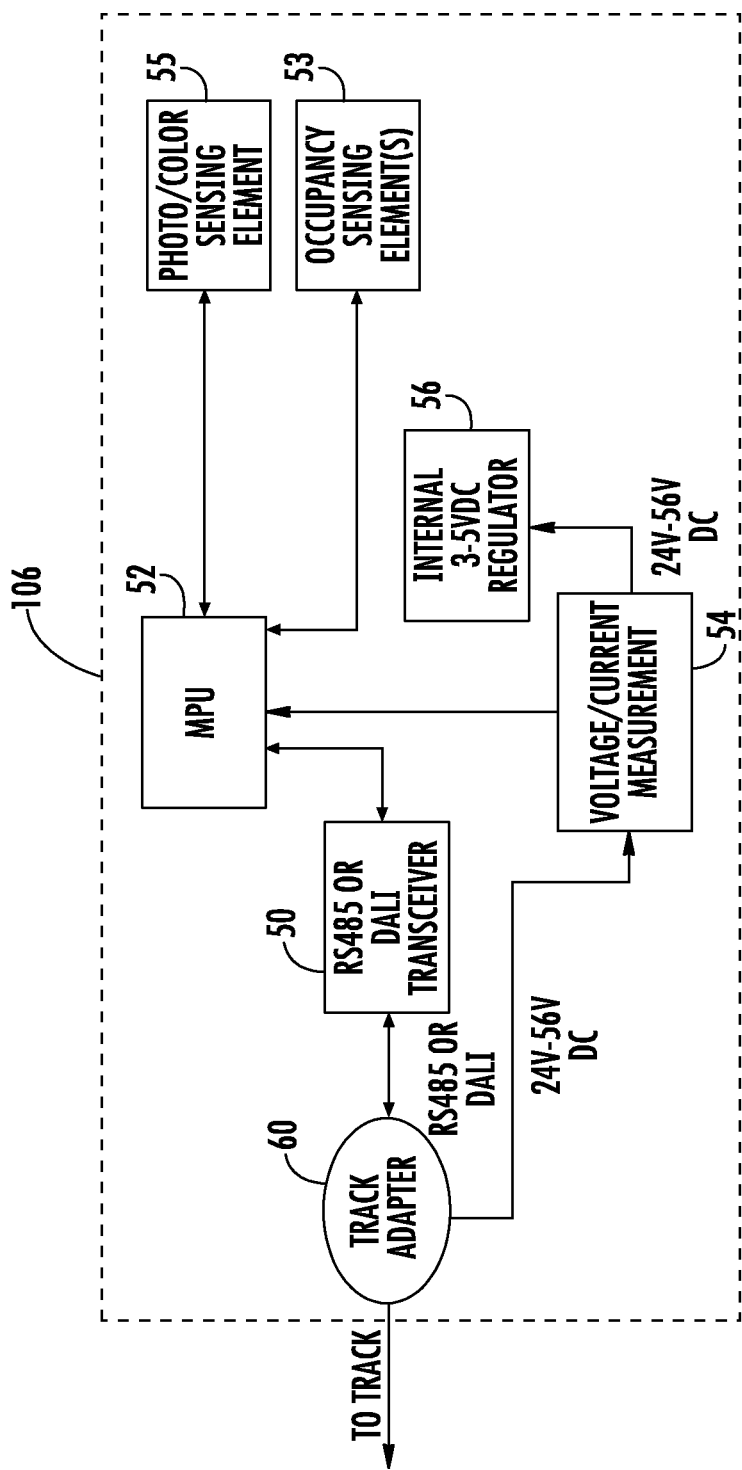
FIG. 11 is a schematic diagram of an exemplary track mounted sensor.

Furthermore, while FIG. 10 depicts the sensing elements 53, 55 as being located within the track head 40, it is contemplated that the sensing elements 53, 55 may be integrated into the PTI device 80 and may use the microprocessor 85 in the PTI device 80. Referring to FIG. 11, a schematic diagram of a standalone track mount sensor 106 that may be used in connection with the PoE tracking lighting system 1. The standalone track mount sensor 106 illustrated in FIG. 11 is substantially identical to the track head 140 described in FIG. 10 except that the standalone track mount sensor 106 does not include an LED driver for powering or illuminating LEDs. The standalone track mount sensor 106 may include a transceiver 50, a microprocessor 52, a voltage regulator 56 for maintaining a constant voltage, and one or more sensing elements 53, 55 such as, for example, an occupancy sensor 53 for detecting the presence or absence of a person in the area and/or a light detector 55 for detecting the light level in the area being monitored. The sensing element 53, 55 may be electrically coupled to the microprocessor 52 for sending, for example, occupancy information and light level information to the microprocessor 52, which, in turn, processes and/or relays the information to the transceiver 50. The transceiver 50 may be electrically coupled to the track adapter 60 so that the transceiver 50 can bi-directionally communicate with the PTI device 80 (FIG. 8). Specifically, the transceiver 50 may report or transmit any sensing information obtained from the one or more sensing elements 53, 55. In addition, the transceiver 50 may receive, inter alia, the second digital communication signal from the PTI device 80 via the PoE enabled low voltage track channel 30 and track adapter 60. In this manner, the standalone track mount sensor 106 is capable of receiving, inter alia, any information relating to the control or operation of the sensing elements 53, 55. In addition, the transceiver 50 enables standalone track mount sensor 106 to report status, such as, for example, sensor failure and energy consumption. The transceiver 50 may be, for example, an RS485, DALI, or other appropriate protocol transceiver.

The standalone track mount sensor 106, and specifically, the track adaptor 60 may be constructed with power and communication conductors to contact the power conductors 34, 35 and communication conductors 36, 37 of the PoE enabled low voltage track channel 30.

The standalone track mount sensor 106 may also include a current sensing element 54 to monitor the current drawn by the standalone track mount sensor 106 to facilitate current limiting to satisfy energy codes and power monitoring.

Furthermore, while FIG. 11 depicts the standalone track mount sensor 106 as including both an occupancy sensor and a light level detector, it is contemplated that the standalone track mount sensor 106 may include an occupancy sensor without the light level detector, and vice-versa. Also, while FIG. 11 depicts the sensing elements 53, 55 as being an occupancy sensor and light level detector, respectively, it is contemplated that other sensing elements may also be incorporated in lieu of or in combination with the occupancy sensor and light level detector.

Figure 12:
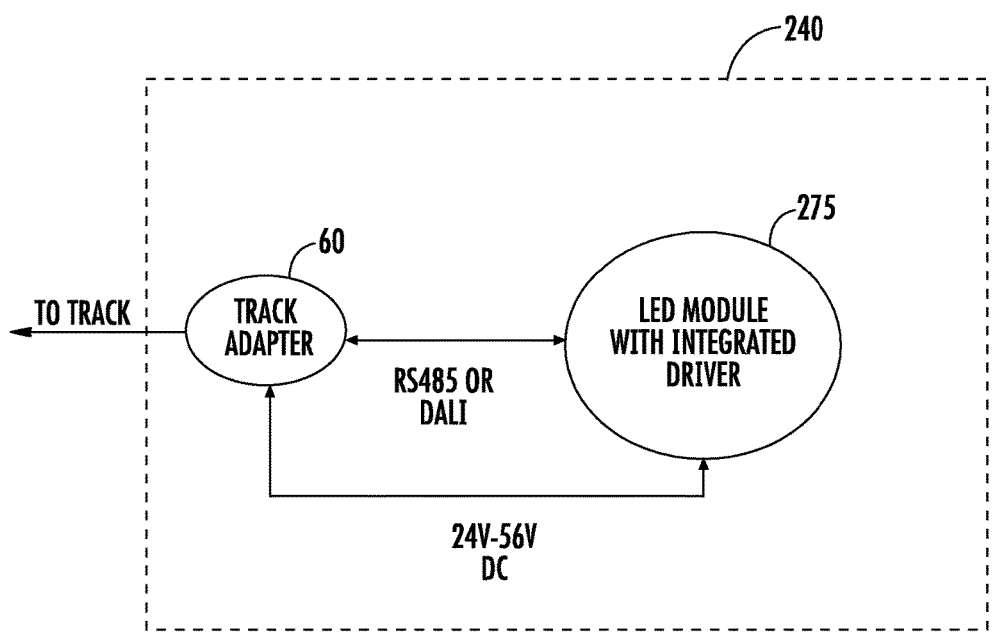
FIG. 12 is a schematic diagram of another exemplary track head with integrated unitary lighting module.

Referring to FIG. 12, a schematic diagram of another exemplary track head 240 including a unitary lighting module 275 that utilizes the low voltage DC current as a power supply. In this scenario, the track head 240 would not require an LED driver. Rather, the track head 240 incorporates a unitary lighting module 275 that includes an integrated LED driver and LED module in a single chip. In use, the unitary lighting module 275 receives the low voltage DC current and second digital communication signal from the PoE enabled low voltage track channel 30 (FIGS. 2 and 3) via the track adapter 60, as previously described, so that the unitary lighting module 275 can bi-directionally communicate with the PTI device 80 (FIG. 8). Specifically, the unitary lighting module 275 may receive, inter alia, the second digital communication signal from the PTI device 80 via the PoE enabled low voltage track channel 30 and track adapter 60. In this manner, the track head 240 including the unitary lighting module 275 is capable of receiving, inter alia, the necessary control information to illuminate, dim, brighten, change color, etc. In addition, the track head including 240 the unitary lighting module 275 may be able to report status, such as, for example, lamp failure and energy consumption. The lighting module 275 would be capable of receiving the second digital communication signal to control the light module properties. This would work with standard LED light sources and special electronics would replace the need for the LED driver; also light sources that receives DC directly and receives communication data, would not require the additional electronics.

Figure 13:
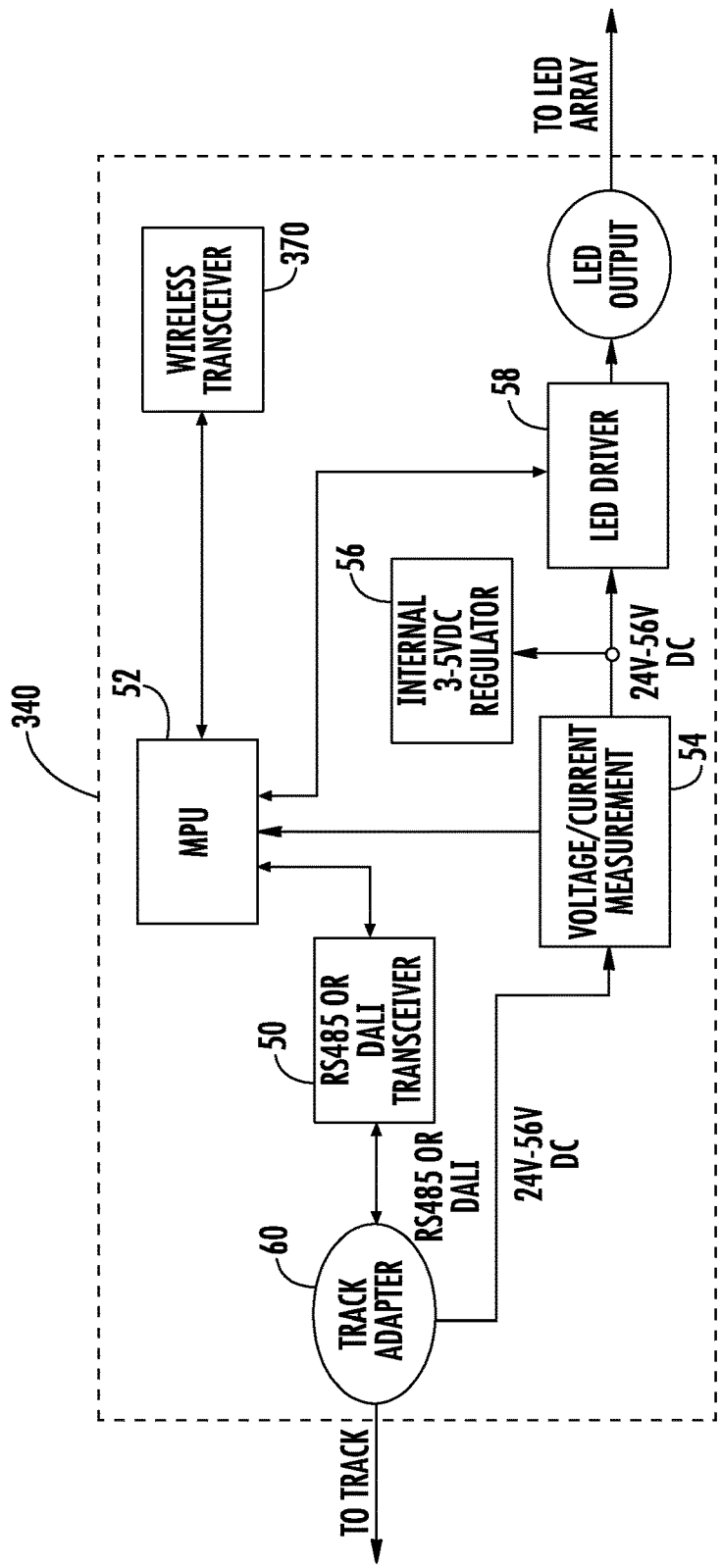
FIG. 13 is a schematic diagram of an alternate exemplary track head with LED driver, the track head further incorporating a wireless transceiver.

Referring to FIG. 13, a schematic diagram of another alternate track head 340 including an LED driver that may be used in connection with the PoE lighting control system 1 is disclosed. The track head 340 illustrated in FIG. 13 may be substantially identical to the track head 40 described in FIG. 9 except as provided herein. The track head 340 may also incorporate a wireless transceiver 370 located within the track head 340 so that the track head 340 may wirelessly communicate with, for example, a wireless remote sensor, a wireless control station, or a wireless lighting control system. The wireless transceiver 370 may be electrically coupled to the microprocessor 52 for sending, for example, any wireless control signals to the microprocessor 52, which, in turn, processes the information and relays applicable control signals to the LED driver 58. While FIG. 13 is shown and described as including a single wireless transceiver, it is contemplated that the track head 340 could include multiple wireless transceivers. In this manner, the track head 370 could be configured to communicate with multiple different wireless protocols. The wireless transceiver 370 can be any wireless protocol including, but not limited, to Bluetooth, ZigBee, Wi-Fi, RF, etc.

In use, coupling the track head 340 to the PoE enabled low voltage track channel 30, electrically connects the wireless transceiver 370 to the PoE enabled low voltage track channel 30 so that signals received from the wireless transceiver 370 can be transmitted to the PoE enabled low voltage track channel 30 via the communication conductors 36, 37 (FIGS. 6A and 6B) of the PoE enabled low voltage track channel 30 and, hence to the PTI device 80 (FIG. 8) coupled thereto. In this manner, the system enables a user to wirelessly control the PoE enabled low voltage track channel 30, and the devices coupled thereto. In addition, signals from the PTI device 80 and the track head 340 can be wireless transmitted to the wireless remote sensor, control station or lighting control system.

Figure 14:
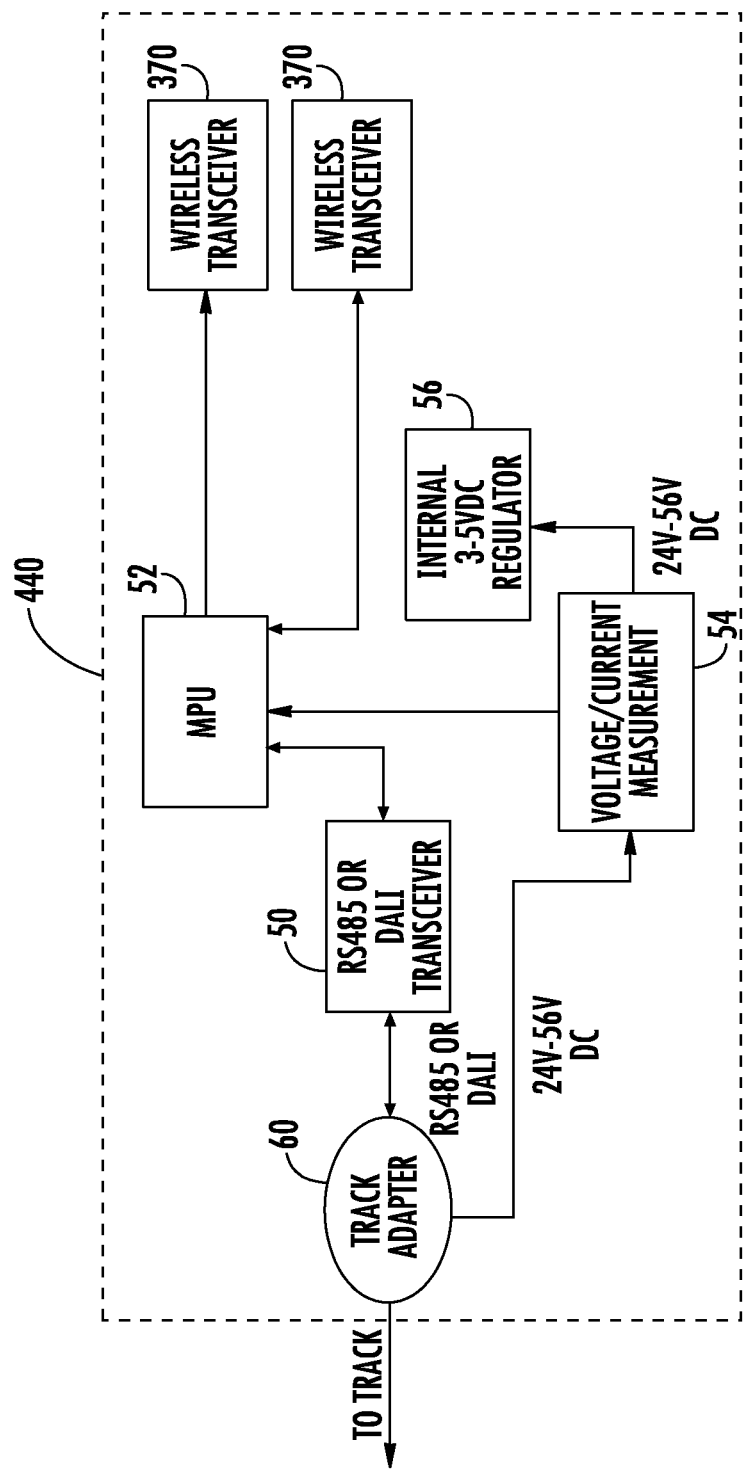
FIG. 14 is a schematic diagram of a track mounted wireless transceiver.

While a wireless transceiver 370 has been described and illustrated as being in the track head 340, it is also contemplated that the wireless transceiver 370 can also be incorporated into a track head incorporating additional sensing elements, for example, in track head 140 shown in FIG. 10, a standalone track mount sensor, for example, track mount sensor 106 shown in FIG. 11, a track head incorporating a unitary lighting module, for example, track head 240 incorporating unitary lighting module 275, or the PTI device 80 (as shown in FIGS. 7 and 8). In addition, referring to FIG. 14, a standalone track mounted wireless transceiver 440 is also contemplated. The standalone track mounted wireless transceiver 440 illustrated in FIG. 14 is substantially identical to the track head 340 including a wireless transceiver 370 illustrated in FIG. 13, but without the LED driver for powering or illuminating LEDs. Similar to the track 340 and the standalone track mounted sensor 106, the standalone track mounted wireless transceiver 440 may include a transceiver 50, a microprocessor 52, a voltage regulator 56 for maintaining a constant voltage, and one or more wireless transceiver 370.

In use, the standalone track mounted wireless transceiver 440 allows the PoE enabled low voltage track channel 30 (FIGS. 2 and 3 FIGS. 2-3), and hence PTI device 80 (FIG. 8) to wirelessly communicate with, for example, a wireless remote sensor, a wireless control station, or a wireless lighting control system, via the standalone track mounted wireless transceiver 440. Coupling the standalone track mounted wireless transceiver 440 to the PoE enabled low voltage track channel 30, electrically connects the wireless transceivers 370 to the PoE enabled low voltage track channel 30, and hence to the PTI device 80, so that signals received from the wireless transceivers 370 can be transmitted to the PoE enabled low voltage track channel 30 via the communication conductors 36, 37 of the PoE enabled low voltage track channel 30 and, hence to the PTI device 80 coupled thereto. In this manner, the system enables a user to wirelessly control the PoE enabled low voltage track channel 30. In addition, signals from the PTI device 80 and from devices coupled thereto, can be wireless transmitted to the wireless remote sensor, control station or lighting control system.

While FIG. 14 is shown and described as including two wireless transceivers, it is contemplated that the standalone track mounted wireless transceiver could include more or less wireless transceivers. The wireless transceiver 370 can be any wireless protocol including, but not limited, to Bluetooth, ZigBee, Wi-Fi, RF, etc.

In an exemplary embodiment of the PoE track light system 20, each track head 40, 140, 240, 340, standalone track mounted sensor 106 and standalone track mounted wireless transceiver 440 may include an assigned address stored in a memory element. That is, each track head 40, 140, 240, 340, standalone track mounted sensor 106 and standalone track mounted wireless transceiver 440 may be individually addressed, so that each device can be controlled individually or together. For example, each track head could be controlled by a central control system incorporating a central server that includes control algorithms to control the lighting level, color/temperature, etc. of each individual track head or device, and which receives and interprets the signals from the sensor and switches. Alternatively, each track head in a room could be controlled by a distributed room controller. Control may also be incorporated into the power sourcing equipment.

In addition, while the standalone track mounted sensor 106 of FIG. 11 and the standalone track mounted wireless transceiver 440 of FIG. 14 have been described and illustrated in connection with a PoE enabled track lighting system including a PTI device (e.g. PTI device 80 of FIG. 8), one skilled in the art will appreciate that the standalone track mount sensor of FIG. 11 and/or the standalone track mounted wireless transceiver of FIG. 14 or combination thereof, may also be used in connection with a non-PoE enabled DC powered track channel where the standalone track sensor and/or standalone wireless transceiver may send and receive data via the track channel to and from individual track heads or other standalone track sensors and/or wireless transceivers without the need of sending the data through the PTI device.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

The invention claimed is:

1. A Power over Ethernet (PoE) track lighting system, comprising:
   a PoE power source equipment;
   a power and communication link coupled to the PoE power source equipment;
   a PoE enabled low voltage track channel including a pair of power conductors and a pair of communication conductors;
   a track head electrically coupled to the PoE enabled low voltage track channel, the track head including a light emitting diode (LED), a pair of power conductors and a pair of communication conductors for contacting the power and communication conductors of the PoE enabled low voltage track channel, respectively; and
   a PoE track interface (PTI) device electrically coupled to the PoE power source equipment and the PoE enabled low voltage track channel, the PTI device coupled to the power and communication link for receiving a low voltage DC current signal and a digital communication signal from the PoE power source equipment, the PTI device transmitting the low voltage DC current and a second digital communication signal to the PoE enabled low voltage track channel;
   wherein the PTI device (i) separates the received digital communication signal from the received low voltage DC current, (ii) transmits the low voltage DC current to the power conductors of the PoE enabled low voltage track channel, and (iii) converts the received digital communication signal to the second digital communication signal for transmission to the communication conductors of the PoE enabled low voltage track channel; and
   wherein connecting the power conductors in the track head to the power conductors in the PoE enabled low voltage track channel transmits the low voltage DC current to the track head for illuminating the LED, and transmits the second digital communication signal to the track head.

2. The PoE track lighting system of claim 1, wherein the track head includes a wireless transceiver for receiving wireless communication signals from one of a wireless remote sensor, a wireless control station, or a wireless lighting control system.

3. The PoE track lighting system of claim 2, wherein the wireless transceiver is electrically coupled to a microprocessor for communicating the received wireless communications signals to the microprocessor, the microprocessor processing the received wireless communication signals and controlling an LED driver in response thereto.

4. The PoE track lighting system of claim 2, wherein coupling the track head to the PoE enabled low voltage track channel, electrically connects the wireless transceiver to the PoE enabled low voltage track channel so that the received wireless communication signals can be transmitted to the PoE enabled low voltage track channel.

5. The PoE track lighting system of claim 1, wherein the PTI device is electrically coupled to a plurality of PoE power source equipment via a plurality of power and communication links, respectively, the PTI device is adapted and configured to combine the DC current from each of the plurality of PoE power source equipment to produce and deliver a higher power DC current to the PoE enabled low voltage track channel.

6. The PoE track lighting system of claim 1, wherein the PTI device further comprising a track conductor adapted and configured to engage the PoE enabled low voltage track channel at an end thereof.

7. The PoE track lighting system of claim 6, wherein the PoE enabled low voltage track channel includes a hollow interior cavity, the track conductor being sized and configure to be slidably received within the hollow interior cavity of the PoE enabled low voltage track channel.

8. The PoE track lighting system of claim 7, wherein the track conductor includes a pair of the power conductors and a pair of communication conductors such that positioning the track conductor within the hollow interior cavity of the PoE enabled low voltage track channel causes the power conductors of the track conductor to contact the power conductors of the PoE enabled low voltage track channel and the communication conductors of the track conductor to contact the communication conductors of the PoE enabled low voltage track channel.

9. The PoE track lighting system of claim 1, wherein the track head further comprises one or more sensing elements, the sensing element being one of an occupancy sensor for detecting the presence or absence of a person in an area or a light detector for detecting the light level in the area.

10. The PoE track lighting system of claim 1, wherein each track head further includes an assigned address stored in a memory element so that each track head may be individually addressed and controlled.

11. The PoE track lighting system of claim 1, wherein the digital communication signal received by the PTI device is in the form of a digital Ethernet communication signal and the second digital communication signal is in the form of one of DALI, DMX, or Modbus.

12. The PoE track lighting system of claim 11, wherein the PTI device includes a microprocessor to decode the Ethernet communication signal utilizing a TCP/IP based protocol selected from one of one of DALI, DMX, Modbus, or CAN.

13. The PoE track lighting system of claim 1, further comprising at least one of:
a track mounted wireless transceiver for receiving a wireless communication signal from one of a wireless remote sensor, a wireless control station, or a wireless lighting control system, the track mounted wireless transceiver electrically coupled to the PoE enabled low voltage track channel so that the received wireless communication signal can be transmitted to the PoE enabled low voltage track channel; and
a track mounted sensor, the track mounted sensor including a track adapter having a pair of power conductors and a pair of communication conductors for contacting the power and communication conductors of the PoE enabled low voltage track channel, respectively; and at least one sensing element for detecting the presence or absence of a person in an area or a light detector for detecting the light level in the area.

14. A PoE track interface device, comprising:
an input connector for receiving a power and communication link for receiving low voltage DC current and a digital communication signal from a PoE power source equipment;
a microprocessor in electrical communication with the input connector, the microprocessor programmed to receive the digital communication signal from the input connector and convert the digital communication signal into a second digital communication signal; and
a track conductor to transmit the low voltage DC current to power conductors of a PoE enabled low voltage track channel, and to transmit the second digital communication signal to a communication conductor of the PoE enabled low voltage track channel;
wherein the second digital communication signal is in the form of a protocol that is more suitable for transmission along the communication conductor of the PoE enabled low voltage track channel.

15. The PoE track interface device of claim 14, wherein the digital communication signal received by the input connector is in the form of a digital Ethernet communication signal and the second digital communication signal is in the form of one of DALI, DMX, or Modbus.

16. The PoE track interface device of claim 15, wherein the microprocessor decodes the Ethernet communication signal utilizing a TCP/IP based protocol selected from one of DALI, DMX, Modbus, or CAN.

17. The PoE track interface device of claim 14, wherein the input connector receives a connector of a power and communication link to connect to the PoE power source equipment.

18. The PoE track interface device of claim 17, wherein the input connector includes two or more input connectors, each input connector being adapted and configured to receive a power and communication link for receiving low voltage DC current and digital communication signal from a PoE power source equipment.

19. The PoE track interface device of claim 18, further comprising a DC current combiner, the DC current combiner receives the low voltage DC current from each of the PoE power source equipment coupled to the input connectors, the DC current combiner outputting a higher power DC current to the track conductor for transmission to power conductors located of PoE enabled low voltage track channel.

20. The PoE track interface device of claim 14, wherein the track conductor is adapted and configured to slidably engage an end portion of the PoE enabled low voltage track channel.

21. The PoE track interface device of claim 20, wherein the track conductor includes a pair of the power conductors and a pair of communication conductors so that positioning the track conductor into the end portion of the PoE enabled low voltage track channel causes the power conductors of the track conductor to contact corresponding power conductors of the PoE enabled low voltage track channel and causes the communication conductors of the track conductor to contact corresponding communication conductors of the PoE enabled low voltage track channel.

22. A method for enabling a Power over Ethernet (PoE) track lighting system, comprising:
supplying a low voltage DC current and digital communication signal via a power and communication link;
separating the received digital communication signal from the received low voltage DC current;
transmitting the low voltage DC current to power conductors of a PoE enabled low voltage track channel;
converting the received digital communication signal to a second digital communication signal; and
transmitting the second digital communication signal to communication conductors of the PoE enabled low voltage track channel.

23. The method of claim 22, further comprising:
supplying one or more additional low voltage DC current and digital communication signals via one or more additional power and communication links, respectively; and combining the supplied low voltage DC currents from each of the power and communication links to produce and deliver a higher power DC current to the PoE enabled low voltage track channel.

24. The method of claim 22, further comprising coupling a PoE power source equipment to the power and communication link for supplying the low voltage DC current and digital communication signal.

* * * * *